(12) United States Patent
Heck et al.

(10) Patent No.: US 11,023,751 B2
(45) Date of Patent: Jun. 1, 2021

(54) SYSTEMS AND METHODS FOR SAFE ROUTE DETERMINATION

(71) Applicant: Nauto, Inc., Palo Alto, CA (US)

(72) Inventors: Stefan Heck, Palo Alto, CA (US); Suchitra Sathyanarayana, Palo Alto, CA (US); Charles Hornbaker, Palo Alto, CA (US)

(73) Assignee: Nauto, Inc., Palo Alto, CA (US)

( * ) Notice: Subject to any disclaimer, the term of this patent is extended or adjusted under 35 U.S.C. 154(b) by 0 days.

(21) Appl. No.: 16/946,723

(22) Filed: Jul. 1, 2020

(65) Prior Publication Data

US 2020/0334473 A1 Oct. 22, 2020

Related U.S. Application Data

(63) Continuation of application No. 15/993,545, filed on May 30, 2018, now Pat. No. 10,733,460, which is a
(Continued)

(51) Int. Cl.
| | |
|---|---|
| *G06K 9/00* | (2006.01) |
| *G06N 7/00* | (2006.01) |
| *G05D 1/00* | (2006.01) |
| *G06K 9/62* | (2006.01) |
| *G06N 20/00* | (2019.01) |
| *G01C 21/34* | (2006.01) |
| *G06Q 10/04* | (2012.01) |
| *G07C 5/08* | (2006.01) |
| *H04N 5/247* | (2006.01) |
| *G09B 29/00* | (2006.01) |
| *G07C 5/00* | (2006.01) |

(52) U.S. Cl.
CPC ..... *G06K 9/00805* (2013.01); *G01C 21/3461* (2013.01); *G05D 1/0088* (2013.01); *G06K 9/00845* (2013.01); *G06K 9/6218* (2013.01); *G06N 7/005* (2013.01); *G06N 20/00* (2019.01); *G06Q 10/047* (2013.01); *G01C 21/3492* (2013.01); *G07C 5/008* (2013.01); *G07C 5/0866* (2013.01); *G09B 29/007* (2013.01); *H04N 5/247* (2013.01)

(58) Field of Classification Search
CPC .................................................. G06K 9/0085
See application file for complete search history.

(56) References Cited

U.S. PATENT DOCUMENTS

| | | | | |
|---|---|---|---|---|
| 8,619,135 | B2 * | 12/2013 | Shellshear | H04N 7/18 348/135 |
| 8,654,151 | B2 * | 2/2014 | Kim | G06T 19/006 345/633 |

(Continued)

OTHER PUBLICATIONS

Foreign Office Action dated Nov. 10, 2020 for EP Appln. No. 18772853.0.

*Primary Examiner* — Alex C Dunn

(74) *Attorney, Agent, or Firm* — Vista IP Law Group, LLP

(57) ABSTRACT

A method for safe route determination, including determining a geographic risk map for a geographic region, wherein the geographic risk map is determined based on a vehicle event dataset aggregated from a plurality of vehicles enabled with an onboard vehicle system, and automatically determining a route between two locations in the geographic region based on the geographic risk map.

20 Claims, 5 Drawing Sheets

Related U.S. Application Data continuation-in-part of application No. 15/892,899, filed on Feb. 9, 2018, now Pat. No. 10,268,909, which is a continuation of application No. 15/705,043, filed on Sep. 14, 2017, now Pat. No. 9,928,432.

(60) Provisional application No. 62/412,419, filed on Oct. 25, 2016, provisional application No. 62/394,298, filed on Sep. 14, 2016, provisional application No. 62/512,311, filed on May 30, 2017.

(56) References Cited

U.S. PATENT DOCUMENTS

| | | | |
|---|---|---|---|
| 9,429,439 B2* | 8/2016 | Stumper | G08G 1/145 |
| 9,491,374 B1* | 11/2016 | Avrahami | G06K 9/00765 |
| 9,688,150 B2* | 6/2017 | Seong | B60L 3/0007 |
| 9,805,601 B1* | 10/2017 | Fields | G06Q 40/08 |
| 9,812,016 B2* | 11/2017 | Oremus | G08G 1/166 |
| 2006/0186702 A1* | 8/2006 | Kisanuki | B60R 21/36 |
| | | | 296/187.04 |
| 2006/0247852 A1* | 11/2006 | Kortge | G01C 22/00 |
| | | | 701/533 |
| 2008/0036580 A1 | 2/2008 | Breed | |
| 2010/0219944 A1 | 9/2010 | McCormick et al. | |
| 2012/0185091 A1* | 7/2012 | Field | G05D 1/0044 |
| | | | 700/254 |
| 2013/0253809 A1* | 9/2013 | Jones | G08G 1/164 |
| | | | 701/117 |
| 2015/0160024 A1* | 6/2015 | Fowe | G01C 21/3461 |
| | | | 701/400 |
| 2015/0189241 A1* | 7/2015 | Kim | G06F 3/013 |
| | | | 348/148 |
| 2015/0221136 A1* | 8/2015 | Shaburova | G06K 9/46 |
| | | | 345/419 |
| 2015/0254603 A1* | 9/2015 | Bashkin | A47B 57/06 |
| | | | 312/237 |
| 2015/0260531 A1* | 9/2015 | Ehsani | G01C 21/3484 |
| | | | 701/538 |
| 2015/0294422 A1* | 10/2015 | Carver | G06Q 40/08 |
| | | | 705/4 |
| 2016/0049075 A1* | 2/2016 | Sato | G01C 21/3461 |
| | | | 340/905 |
| 2016/0063761 A1* | 3/2016 | Sisbot | G06F 3/013 |
| | | | 345/633 |
| 2016/0139977 A1* | 5/2016 | Ashani | G06F 11/0751 |
| | | | 714/26 |
| 2017/0011529 A1* | 1/2017 | Urashita | G06T 5/20 |
| 2017/0053461 A1 | 2/2017 | Pal et al. | |
| 2017/0061222 A1* | 3/2017 | Hoye | G06K 9/00791 |
| 2017/0064363 A1* | 3/2017 | Wexler | H04N 21/4223 |
| 2017/0089710 A1* | 3/2017 | Slusar | G01C 21/3602 |
| 2017/0101093 A1* | 4/2017 | Barfield, Jr. | G08G 1/096775 |
| 2017/0146801 A1* | 5/2017 | Stempora | G06Q 10/063 |
| 2017/0200061 A1* | 7/2017 | Julian | G06K 9/00791 |
| 2017/0221149 A1* | 8/2017 | Hsu-Hoffman | G06Q 40/08 |
| 2017/0251163 A1* | 8/2017 | Ochiai | H04N 5/23219 |
| 2017/0292848 A1* | 10/2017 | Nepomuceno | G01C 21/3492 |
| 2017/0309072 A1* | 10/2017 | Li | G06F 3/0488 |
| 2018/0012085 A1* | 1/2018 | Blayvas | H04N 13/20 |

* cited by examiner

SYSTEMS AND METHODS FOR SAFE ROUTE DETERMINATION

CROSS-REFERENCE TO RELATED APPLICATIONS

This application is a continuation of U.S. patent application Ser. No. 15/993,545 filed on May 30, 2018, pending, which is a continuation-in-part application of U.S. patent application Ser. No. 15/892,899 filed Feb. 9, 2018, now U.S. Pat. No. 10,268,909, which is a continuation of U.S. patent application Ser. No. 15/705,043 filed Sep. 14, 2017, now U.S. Pat. No. 9,928,432, which claims the benefit of U.S. Provisional Patent Application No. 62/394,298 filed Sep. 14, 2016, now lapsed, and U.S. Provisional Patent Application No. 62/412,419 filed Oct. 25, 2016, now lapsed, each of which is incorporated in its entirety by this reference. This U.S. patent application Ser. No. 15/993,545 also claims the benefit of U.S. Provisional Patent Application No. 62/512,311 filed May 30, 2017, now lapsed, which is incorporated in its entirety by this reference.

TECHNICAL FIELD

This invention relates generally to the automotive analysis field, and more specifically to a new and useful system and method for safe route determination in the automotive analysis field.

BACKGROUND

Automotive safety has been a persistent issue ever since automobiles were invented. Historically, attempts at improving automotive safety have been focused on either improving the vehicle itself (e.g., safety systems thereof) or disincentivizing poor drivers from driving. The lack of vehicle event data that captures the gamut of vehicle operation in situations that do not rise to the level of ex post facto determination (e.g., a collision) has prevented their incorporation into determining safe routes by which to navigate vehicles (e.g., to minimize safety risk along the route).

Thus, there is a need in the automotive analysis field to create a new and useful system and method for safe route determination. This invention provides such new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
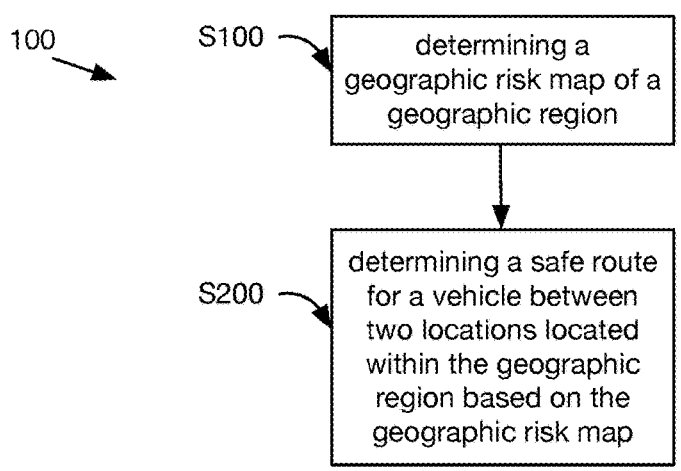
FIG. 1 is a flowchart representation of the method for safe route determination.

As shown in FIG. 1, the method 100 for safe route determination includes: determining a geographic risk map of a geographic region S100 and automatically determining a route (e.g., a safe route) for a vehicle between two locations located within the geographic region based on the geographic risk map S200. The method 100 functions to convert vehicle event data into a spatial mapping of quantifiable driving risk factors, and utilize the spatially mapped, quantifiable driving risk factors to route a vehicle based on risk (e.g., minimizing risk, maximizing safety, mitigating risk, etc.). The method 100 can also function to provide a geographic risk map to third parties (e.g., as a service, in substantially real-time, as a data layer for a navigation application, etc.). The method 100 can additionally or alternatively have any suitable function.

The method is preferably performed for a physical vehicle traversing through a physical volume (e.g., the geographic region), but can be performed for a virtual model (e.g., of a vehicle) or otherwise performed. The vehicle can be: an automobile, a motorcycle, a bicycle, a skateboard, an aerial system (e.g., a drone, plane, etc.), a velocipede, or be any other suitable vehicle. The vehicle can be driven by a human driver, be automatically controlled, be telematically (e.g., remotely, teleoperatively, etc.) controlled, or be otherwise controlled. The method is preferably performed for each of a plurality of vehicles, but can alternatively be performed for a single vehicle or any other suitable set of vehicles.

The method is preferably performed in real- or near-real time, but all or portions of the method can alternatively be performed asynchronously or at any other suitable time. The method is preferably iteratively performed at a predetermined frequency (e.g., every millisecond, at a sampling frequency, etc.), but can alternatively be performed in response to occurrence of a performance event (e.g., change in the vehicle attitude, change in user distraction levels, receipt of driving session information, receipt of new sensor information, physical vehicle entry into a geographic region associated with high collision risk, object proximity detection, etc.), be performed a single time for a driving session, be performed a single time for the vehicle, or be performed at any other suitable frequency.

The method is preferably performed in conjunction with an onboard vehicle system (e.g., a computing system onboard each vehicle of the plurality of vehicles), but can alternatively be entirely or partially performed by a remote computing system, such as a server system, a user device, such as a smartphone, or by any other suitable set of computing systems. The method is preferably performed using data sampled by the onboard vehicle system, but can additionally or alternatively be performed using vehicle data (e.g., signals sampled by the vehicle sensors), other vehicles' data (e.g., received from the source vehicle or a remote computing system), aggregate population data, historic data (e.g., for the vehicle, driver, geographic location, etc.), or any other suitable data from any other suitable source.

The onboard vehicle system can include a processing system (e.g., a set of GPUs, CPUs, microprocessors, TPUs, a processor, etc.), storage system (e.g., RAM, Flash), communication system, sensor set, power system (e.g., battery, vehicle power connector, photovoltaic system, etc.), housing, or any other suitable component. The communication system can include telemetry systems (e.g., for vehicle-to-vehicle, vehicle-to-infrastructure, vehicle-to-remote computing system, or other communications), wireless systems (e.g., cellular, WiFi or other 802.11x protocols, Bluetooth, RF, NFC, etc.), wired systems (e.g., Ethernet, vehicle bus connections, etc.), or any other suitable communication systems. The sensors can include: cameras (e.g., wide angle, narrow angle, or having any other suitable field of view; visible range, invisible range, IR, multispectral, hyperspectral, or sensitive along any suitable wavelength; monocular, stereoscopic, or having any suitable number of sensors or cameras; etc.), kinematic sensors (e.g., accelerometers, IMUs, gyroscopes, etc.), optical systems (e.g., ambient light sensors), acoustic systems (e.g., microphones, speakers, etc.), range-finding systems (e.g., radar, sonar, TOF systems, LIDAR systems, etc.), location systems (e.g., GPS, cellular trilateration systems, short-range localization systems, dead-reckoning systems, etc.), temperature sensors, pressure sensors, proximity sensors (e.g., range-finding systems, short-range radios, etc.), or any other suitable set of sensors.

In one variation, the onboard vehicle system includes a set of internal sensors, a set of external sensors, and a processing system. The internal sensors (e.g., internal-facing camera, microphones, etc.) can be directed toward and monitor the vehicle interior, more preferably the driver volume but alternatively or additionally any suitable interior volume. The external sensors (e.g., exterior-facing camera) are preferably directed toward the vehicle exterior, more preferably toward a region in front of the vehicle (e.g., region preceding the vehicle along the vehicle trajectory, region proximal the driving volume and encompassing the vehicle drivetrain longitudinal vector, etc.), but can alternatively be directed toward the vehicle side(s), top, bottom, rear, or any other suitable region exterior the vehicle. The sensors are preferably statically mounted to the vehicle and/or each other, but can be movably mounted by a gimbal, damping system, or other motion mechanism.

Figure 2A:
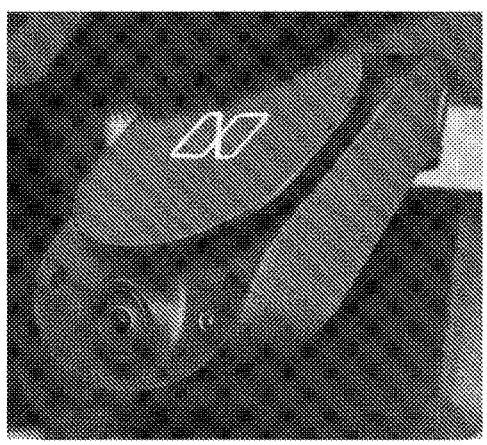
FIGS. 2A and 2B are a front isometric and rear isometric view of an example of the onboard vehicle system, respectively.
Figure 2B:
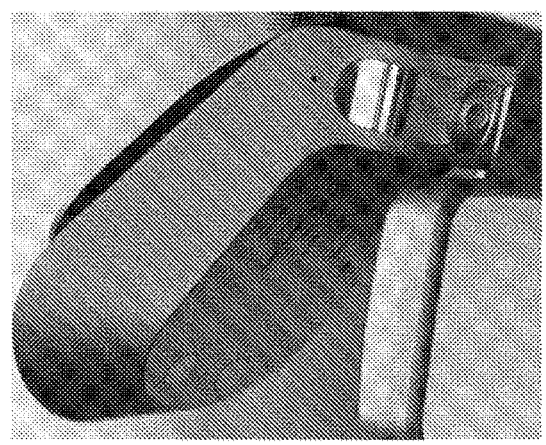

In a specific example (e.g., FIGS. 2A and 2B), the onboard vehicle system includes an interior-facing camera statically mounted at a known orientation relative to the exterior-facing camera (e.g., by a common housing, etc.) and a processor electrically connected to the interior- and exterior-facing cameras, wherein the processor can be arranged within the common housing or outside the common housing. The processor can optionally store a virtual mapping that associates the relative position of one or more points (e.g., pixels) in the exterior-facing camera's field of view (or recorded image) with a position of one or more points (e.g., pixels) in the interior-facing camera's field of view (or recorded image). The interior-facing camera and exterior-facing camera are preferably concurrently operated (e.g., concurrently or synchronously sample interior and exterior images or video, respectively), but can alternatively sample images or video at different rates or times, sample based on the signal values of the other camera (e.g., interior-facing camera sampling is triggered when an external-facing camera condition, such as object detection, is satisfied), or operated at any suitable time. The common housing preferably enables vehicles to be retrofitted with the onboard vehicle system, but the system can alternatively be integrated into the vehicle or otherwise connected. The common housing preferably removably mounts the onboard vehicle system to the vehicle, more preferably to the vehicle interior (e.g., along the dashboard, such as proximal the dashboard center region; along the windshield, such as proximal the rear-view mirror; etc.) but alternatively to the vehicle exterior (e.g., along the hood, along the side mirrors, etc.). However, the onboard vehicle system can be otherwise configured and/or include any suitable set of components in any suitable configuration.

2. Benefits

Variants of the method can confer one or more benefits and/or advantages over conventional systems and/or methods.

First, variants of the method can enable a vehicle operator (e.g., driver, remote operator, autonomous control module, etc.) to determine the safest route by which to navigate the vehicle, given a geographic risk map (e.g., as determined in accordance with the method). The safest route is preferably the least-risky route, as determined based on the geographic risk map that maps a risk score to each suitable location on the map (e.g., spatial zone, roadway segment, discrete point in 2D space, 3D space, etc.). However, the safest route can additionally or alternatively be a route having reduced risk as compared to an alternative route-selection basis (e.g., estimated time to traverse the route, route distance, etc.), and/or any other suitable route determined on the basis of safety (e.g., vehicle safety, occupant safety, safety versus any suitable hazard, etc.). The safest route can be the safest route for the given vehicle or vehicle operator, the safest route across the population of vehicles within the geographic region, the safest route for both the ego vehicle and the other vehicles, or be determined for any suitable set of entities.

Second, variants of the method can enable safety-weighted and/or risk-weighted route determination. For example, the method can include optimizing a route for a vehicle against a set of parameters (e.g., performing a parametric optimization) that includes safety and/or risk in combination with other parameters (e.g., distance, journey time, user preferences, user-acceptable delays or increased distances, such as that received from a user, user-specific tendencies, such as high-risk behaviors particular to the user, etc.), and utilizing the risk scores mapped onto the geographic region of navigation by the geographic risk map to weight each candidate route in the optimization by risk and/or safety. In related examples, the method can include providing a geographic risk map (e.g., as a data layer) to a third-party navigation module for incorporation into a multivariate optimization (e.g., including safety promotion and/or risk mitigation).

Third, variants of the method can enable a population of vehicles equipped with vehicle event detection systems (e.g., onboard vehicle systems) to collect vehicle event data that can be used to generate geographic risk maps, which can subsequently be provided to secondary vehicles (e.g., vehicles not equipped with onboard vehicle systems) to enable the secondary vehicles to be routed according to a safe route and/or risk-weighted route. Thus, such variants of the method can enable safe routing of secondary vehicles, of which there can be a significantly greater number as compared to vehicles equipped with onboard vehicle systems, improving the overall safe performance of a large population of vehicles (e.g., via provision of safe routes) using only a relatively small number of data-gathering vehicles.

Fourth, variants of the method can reduce or conserve the computational resources and/or power consumed while safely routing vehicles (e.g., routing vehicles according to a determined safe route). In one example, the method can monitor (e.g., determine risk scores for, in generating a geographic risk map) a limited geographic region about the vehicle for near-collision events (e.g., only a region encompassing the anticipated route or approximate direction and duration of travel). However, the method can otherwise suitably reduce or conserve computational resources and/or power consumed.

Additionally or alternatively, the system and method can confer any other suitable set of benefits.

3.1 Method—Determining Geographic Risk Map

Figure 4:
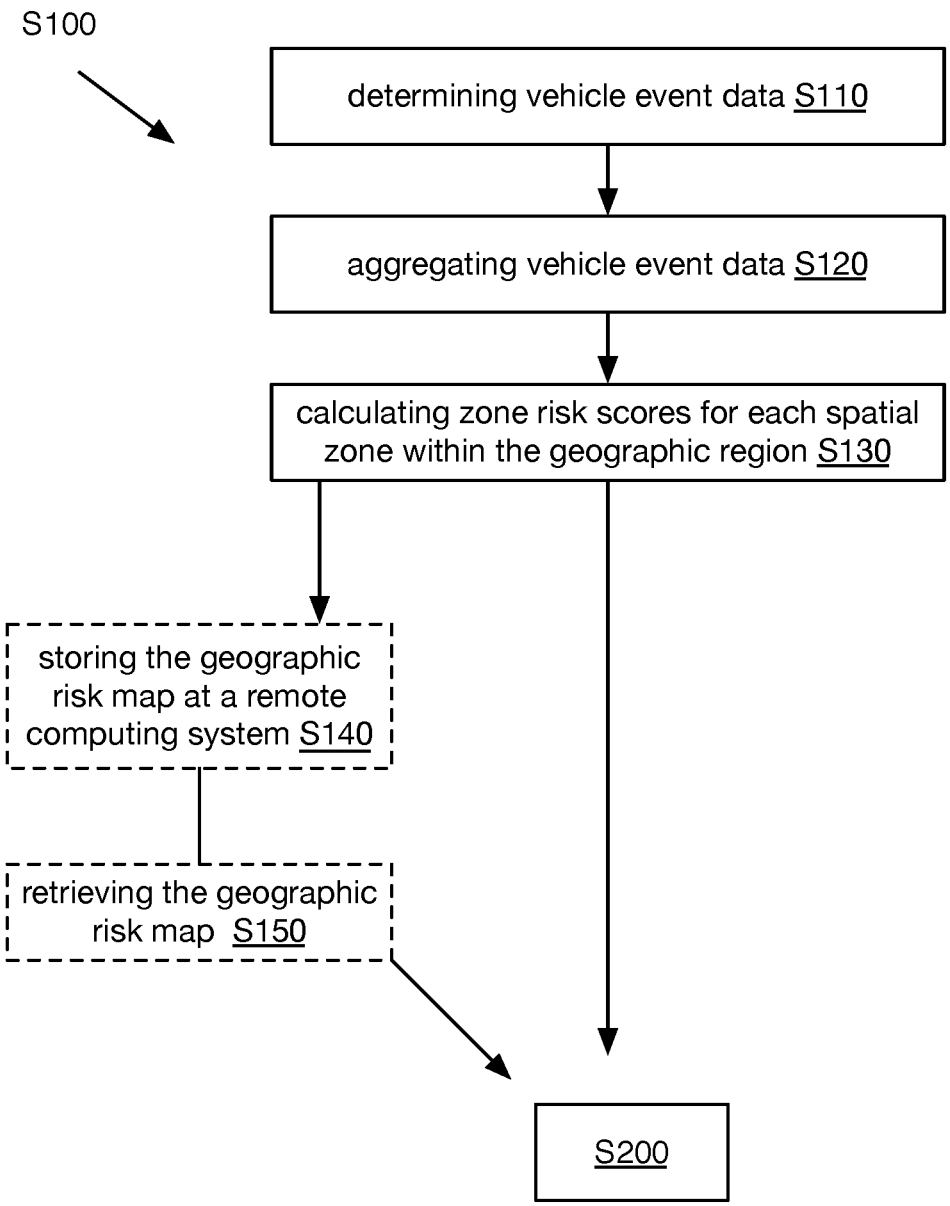
FIG. 4 depicts a flowchart representation of a variation of a portion of the method for safe route determination.

Block S100 includes: determining a geographic risk map of a geographic region. Block S100 functions to convert collected vehicle event data into a map of risk as a function of position within a geographic region (e.g., area). The risk can be represented as a score (e.g., a risk score), and can be assigned to a region or zone within the geographic region (e.g., a spatial zone), and can thus be a zone risk score (as compared to risk scores assigned to other locations or data such as a local risk score or route risk score). As shown in FIG. 4, Block S100 can include: determining vehicle event data S110; aggregating vehicle event data S120; and calculating zone risk scores for each spatial zone within the geographic region S130. Block S100 can optionally include: storing the geographic risk map at a remote computing system S140; retrieving a geographic risk map S150; and any other suitable process blocks for determining a geographic risk map for utilization in other portions of the method 100.

A geographic risk map (e.g., a collision risk map for a given geographic location or region) can be generated from local risk maps (e.g., as determined in conjunction with determining a near-collision event), near-collision events themselves, collision events, and/or any other suitable vehicle event data aggregated across a population of vehicles. The geographic risk map can be generated for and/or stored in association with each of a plurality of locations, a single location, or any location set. The collision risk map can include the risk value (e.g., from the risk maps), collision, and/or near-collision hot-spots (e.g., locations of high probability) in real- or near-real time, for a predetermined recurrent time (e.g., time of day), or for a predetermined time duration (e.g., across all time). In one example, the geographic risk map can reflect a near-real time map of traffic dynamics, which can be used for dynamic route planning (e.g., safe route selection, safety-weighted route determination, etc.), increased ADAS sensitivity, or otherwise used by a secondary vehicle. In a second example, the geographic risk map can be used for infrastructure management or improvement. In a specific example, collision hot-spots (within the geographic region represented by the geographic risk map) can be targeted for driver visibility improvements, traffic lane divider insertion, or other infrastructure improvements. In a third example, the geographic risk map can be used to adjust the parameters of the risk map, parameters of the RAM (e.g., which parameters are included, the parameter value ranges, the parameter weights, the model itself, etc.), conditions triggering near-collision event, collision event, or other vehicle event detection.

Figure 3:
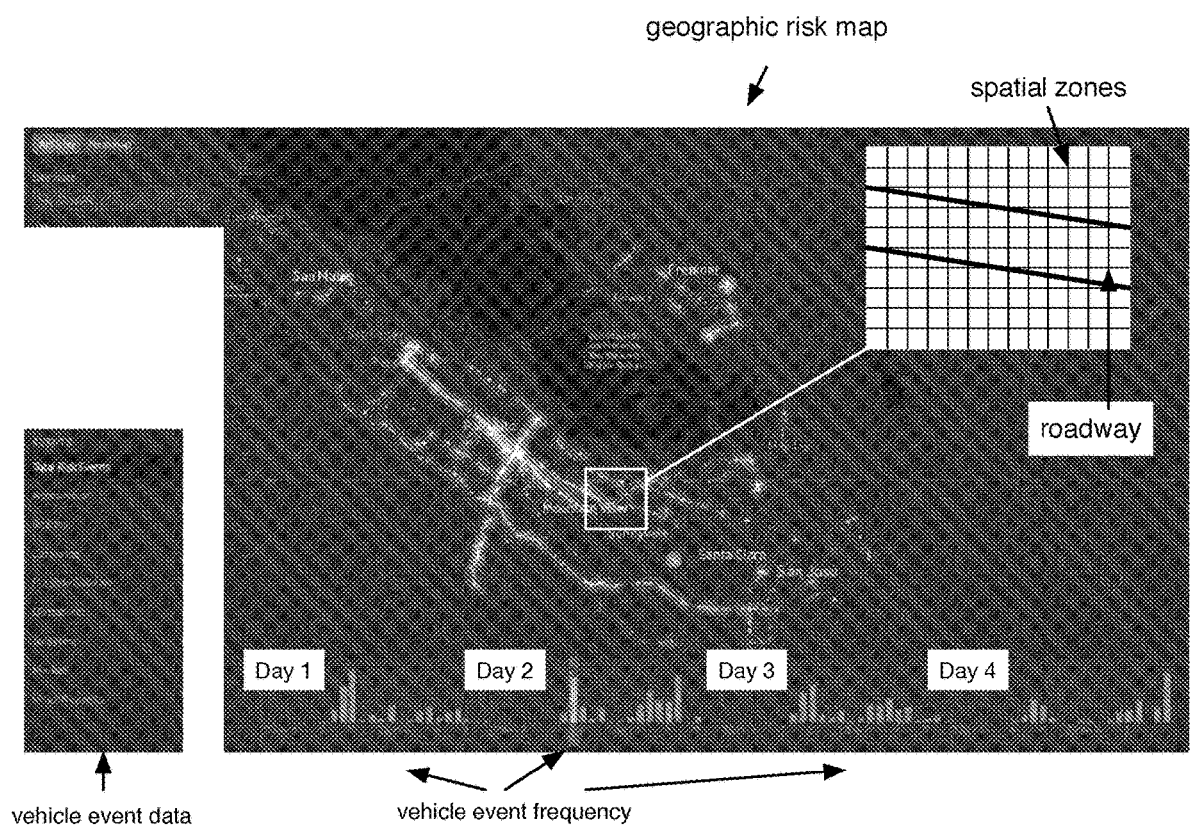
FIG. 3 depicts an example geographic risk map of a geographic region determined in accordance with a variation of the method for safe route determination.

As shown by example in FIG. 3, the geographic risk map can define a set of spatial zones into which the geographic region defined by the geographic risk map is divided. The spatial scale of the spatial zones can be sub-roadway (e.g., as shown in FIG. 3), super-roadway (e.g., greater than one or more dimensions of the roadway), uniform (e.g., as shown in FIG. 3), non-uniform, and have any other suitable properties. The geographic risk map preferably encodes (e.g., maps) vehicle event data as a function of space, and can additionally or alternatively track vehicle event data as a function of time (e.g., day, time of day, etc.). Vehicle event data can be categorized (e.g., as near-collision event vs. collision events, by type of near-collision event, etc.), and the categorizations of the vehicle event data can be used to extract the associated risk scores (e.g., in accordance with one or more Blocks of the method 100).

In a variation, the spatial zones can be categorized by a type of roadway or roadway feature of the roadway(s) within the spatial zones of the geographic region. In a specific example of this variation, a first subset of the set of spatial zones is associated with a junction between two or more roadways per spatial zone (e.g., an intersection), and a second subset of the set of spatial zones is associated with one roadway per spatial zone in the second subset (e.g., a roadway segment). In another specific example of this variation, spatial zones can be categorized (e.g., labeled, tagged, etc.) with the type of roadway (e.g., surface street, highway, freeway, etc.) and/or roadway features (e.g., number of lanes, surface quality, shoulder existence and/or width, etc.). However, spatial zones can be otherwise suitably categorized.

The geographic risk map is preferably dynamically determined (e.g., generated or updated) in real-time, near-real time, at a predetermined frequency, or at any other suitable time, but can be predetermined (e.g., static) and retrieved based on a driving parameter value (e.g., route request, navigation request, driver identifier, vehicle identifier, geographic location, refresh frequency, etc.), or otherwise determined and/or retrieved. The geographic risk map is preferably determined by a remote computing system based on vehicle event data aggregated from a plurality of vehicles (e.g., having associated onboard vehicle systems), but can alternatively be determined on-board the vehicle (e.g., a vehicle ECU, vehicle processor, auxiliary processor on the vehicle, etc.), a local user device, or by any other suitable system, wherein the sampled sensor signals and/or data derived therefrom can be transmitted to the remote computing system for analysis.

The geographic risk map preferably includes a risk score (e.g., risk metric) for each spatial zone (e.g., location, sub-region, point, etc.) within the geographic region represented by the geographic risk map, (e.g., a zone risk score associated with each spatial zone) but can additionally or alternatively include any other suitable information. The risk map can be determined for a set of geolocations (e.g., current vehicle location; locations along a vehicle route; platform-specified locations, such as locations with sparse data or highly variable risk), or be associated with any suitable set of locations. The vehicle's geographic location or region can be determined from the vehicle location system (e.g., a GPS system, a RTK-GPS system, a trilateration system, etc.), using a method disclosed in U.S. patent application Ser. No. 15/673,098 filed 9 Aug. 2017 (incorporated herein in its entirety by this reference), or using any other suitable method.

The geographic risk map can be represented as: an array of risk score values (e.g., a zone risk score associated with each spatial zone with a one-to-one correspondence), a heat map (e.g., stored or visualized as a heat map), an equation, or be otherwise structured. The risk map(s) or parameters thereof (e.g., RAM, factor values, weights, geolocations, etc.) can be stored temporarily (e.g., long enough to analyze the instantaneous risk over the geographic region for safe route determination), for the driving session duration, for longer than the driving session, or for any suitable time. All or a subset of the generated risk maps or parameters thereof can be stored. The risk maps (or parameters thereof) can be stored in association with the respective vehicle identifier, geographic location or region identifier, operator identifier, vehicle kinematics, or any other suitable data, and can be generated on a unique or non-unique basis in relation to the aforementioned identifiers and other suitable data (e.g., an operator-specific geographic risk map can be determined, a vehicle-specific risk map, etc.).

Block S110 includes: determining vehicle event data. Block S110 is preferably performed by an onboard vehicle system as described above, but can additionally or alternatively be performed by any other suitable system. Vehicle event data preferably includes near-collision event data and collision event data, but can additionally or alternatively include any suitable data related to events that occur in relation to a vehicle. Block S110 can thus include: detecting a set of near-collision events and detecting a set of collision events that occur within the geographic region. Block S110 is preferably performed by a plurality of onboard vehicle systems associated with a plurality of vehicles (e.g., wherein each vehicle is equipped with one onboard vehicle system) over a time period (e.g., an hour, a day, a week, a continuously increasing data collection period, etc.). However, Block S110 can be otherwise suitably performed.

Block S110 preferably includes detecting a set of near-collision events, which functions to identify high-risk vehicle events within the geographic region. A near-collision event can be a circumstance requiring an evasive maneuver by the vehicle operator; a circumstance wherein the vehicle has greater than a threshold probability of colliding with an object; or be otherwise defined. Near-collision events and related high-risk behaviors can include: tailgating (e.g., driving within a threshold distance behind a leading vehicle, wherein the threshold distance can be speed-dependent), swerving (e.g., adjusting the lateral position of the vehicle at a rate higher than a threshold rate of adjustment), driver distraction (e.g., based on video analysis of the driver, analysis of in-vehicle IMU data, etc.), and any other suitable events.

In relation to Block S110, a near-collision event is preferably detected based on signals sampled by sensors onboard the vehicle (e.g., auxiliary system sensors, vehicle sensors, proximity sensors, etc.), vehicle parameters (e.g., acceleration pedal position, steering wheel position, brake position, etc.), external vehicle sensor signals, or based on any other suitable measurement, using pattern matching (e.g., wherein the sensor signal pattern matches a pattern associated with a near-collision event), neural networks, rules, or using any other suitable method. For example, the near-collision event can be detected when a deceleration spike is detected in the kinematic sensor measurements, when a surprised driver expression is detected from an interior-facing camera stream, when a kinematic pattern substantially matches a "swerving" pattern (e.g., based on the vehicle's sensors, such as brake pedal position; based on the system's accelerometer, gyroscope, or IMU measurements indicating a G-force exceeding a predetermined threshold; based on images recorded by the recording system; the lateral acceleration exceeds a threshold acceleration; etc.), when the brakes are suddenly applied, when an object occupies more than a threshold proportion of an external-facing camera's field of view, when screeching is detected (e.g., from the audio sensor), when a collision is detected (e.g., wherein the sensor data sampled before the collision time is associated with a near-collision event; wherein a collision is detected in response to the measured G-force exceeding a collision threshold, in response to the acoustic pattern substantially matching a collision pattern, in response to the airbags deploying, or otherwise determined), or when any other suitable condition associated with a near-crash event is detected.

The set of near-collision events is preferably determined (e.g., detected) in real- or near-real time (e.g., as the event is occurring, before the event occurs, etc.), but can be determined asynchronously or at any other suitable time. The near-collision event is preferably determined by the onboard vehicle system (e.g., by an auxiliary system, the vehicle itself, etc.), but can alternatively be determined by any suitable system on-board or off-board the vehicle, a remote computing system, or any other suitable system. Each near-collision event of the set of near-collision events is preferably detected substantially as described in U.S. patent application Ser. No. 15/892,899, filed 9 Feb. 2018, which is incorporated herein in its entirety by this reference. However, detecting the near-collision events can be otherwise suitably performed.

In a specific example, detecting the set of near-collision events includes, for each of the set of near-collision events: recording a first video with an external-facing camera mounted to a vehicle; detecting an object from the first video; determining object parameters for the object from the first video; recording a second video with an internal-facing camera mounted to the vehicle; determining a user behavior score based on the second video; generating a local risk map for the vehicle, the local risk map including a risk score for each of a set of positions within a volume proximal the vehicle, each risk score calculated using a parametric module based on the user behavior score and object parameters; and detecting a near-collision event, which includes detecting a risk score within the risk map exceeding a threshold score.

However, in other examples, each near-collision event of the set of the near-collision event utilized to determine the geographic risk map can be otherwise suitably detected.

Block S110 can include determining object parameters associated with objects in the vicinity of the vehicle (e.g., during operation), which can constitute vehicle event data in variations of the method 100. Object parameters for an object that can be determined in conjunction with one or more portions of the method (e.g., used to generate a local risk map for near-collision event determination, used to determine operator or user behavior, etc.) can include: the object's presence, pose, kinematics, anticipated behavior (e.g., trajectory, kinematics, etc.), current behavior (e.g., classification, pattern, etc.), classification or type, the object's risk map (e.g., transmitted using V2V or V2X communications), object identifier, associated RAM, associated operator identifier, estimated time to collision (e.g., determined based on object kinematics and/or anticipated trajectory, host vehicle kinematics and/or anticipated trajectory, etc.), or other parameters. Object parameters (and/or associated information) are preferably determined by a processing system on-board the vehicle (e.g., the computing system), but can alternatively or additionally be determined by a remote system. However, the object parameters can be predetermined and be stored by a remote database, by a driver user device, by the vehicle, or otherwise stored, and can be retrieved on-demand, in response to access grant, or otherwise accessed or determined. Different parameters can be determined using the same or different signals (e.g., different instances of the same signal type, signals sampled by different sensors, etc.), retrieved from a remote computing system, or otherwise determined.

The object is preferably a physical obstacle external the vehicle, but can be otherwise defined. The object can be static or mobile. Examples of the object include: other vehicles (e.g., automatic vehicles or manually driven), bicycles, pedestrians, signage, curbs, potholes, or any other suitable obstacle that a vehicle can physically interact with. The object can be identified: optically (e.g., from images, video, LIDAR, etc.), acoustically (e.g., from recorded sound, ultrasound, etc.), by matching the object's known location (received from the object) with the object's estimated location (determined based on the vehicle's location), from an object identifier (e.g., license plate, wireless identifier such as RFID, beacon identifier, etc.), or otherwise identified.

Object parameters can be determined based on: the vehicle's on-board sensor signals (e.g., proximity sensors, range-finding sensors, cameras, etc.), computing system sensor signals, the object's sensor signals (e.g., wherein the signals or derivative information are transmitted to the processing system for processing), auxiliary sensors (e.g., sensors in the ambient environment configured to monitor object parameters, such as security cameras, in-road weight sensors, etc.), object navigation information (e.g., driving instructions received from a user device associated with the object), models associated with the object (e.g., type, class), historic object behavior, or from any other suitable information. The object parameters can be determined using: pattern matching, computer vision techniques, parametric methods, nonparametric methods, heuristics, rules, decision trees, Naïve Bayes, Markov, neural networks, genetic programs, support vectors, or any other suitable method.

In a specific example of near-collision event determination at an onboard vehicle system, Block S110 includes recording the first video, detecting the object, determining the object parameters, recording the second video, determining the user behavior score, generating the local risk map, and detecting the near-collision event in real-time by a processor of an onboard vehicle system.

Block S110 can also include detecting a set of collision events that occur within the geographic region. Detecting the set of collision events can include utilizing the onboard vehicle system (e.g., sensors thereof) to detect vehicle events resulting in a collision (e.g., between vehicles, between a vehicle and a non-vehicular object, etc.), retrieving accident data associated with the geographic region (e.g., public records, accident data, emergency response records, etc.) that includes geo-tagged collision information, receiving user input reporting a collision (e.g., from a vehicle operator involved in a collision, from a collision observer, etc.), and/or otherwise suitably obtaining collision data.

Block S120 includes aggregating vehicle event data. Block S120 functions to collect vehicle event data from a plurality of onboard vehicle systems operating within the geographic region, and combine it into a vehicle event dataset for use in determining the geographic risk map. In a specific example, Block S120 includes aggregating the set of near-collision events and the set of collision events into a vehicle event dataset at a remote server communicatively coupled to the plurality of onboard vehicle systems; in this example, Block S100 includes determining, at the remote server, the geographic risk map based on the vehicle event dataset, wherein the geographic risk map defines a zone risk score associated with each of the set of spatial zones.

Block S130 includes calculating zone risk scores for each spatial zone within the geographic region (e.g., of the set of spatial zones). Block S130 functions to compute and assign a quantitative measure of risk, based on the vehicle event data, to each location within the geographic region for use in routing the vehicle through the geographic region (e.g., in accordance with one or more variations of Blocks S200 and S300). Block S130 is preferably implemented by a risk assessment module (RAM) of the remote computing system, but can additionally or alternatively be implemented by a local RAM (e.g., of the onboard vehicles system), and/or any other suitable system or component.

The zone risk score can be determined for the spatial zone, one or more sub-regions of the spatial zone (e.g., a risk point), or for any other suitable region of space. The risk score can be a risk probability mathematically mapped onto a range (e.g., between 0 and 10, between 0 and 1, etc.), or be any other suitable metric mapped onto any other suitable range (or unmapped). The risk score is preferably determined by a risk assessment module (RAM), but additionally or alternatively can be determined by any suitable system.

The zone risk score is preferably indicative of a collision risk for each spatial zone (e.g., of the set of spatial zones) defined by the geographic region, but can additionally or alternatively be indicative of the probability of a collision within the spatial zone, the vehicle's safety within the respective sub-region, or be indicative of any other suitable parameter. The zone risk score can be a continuous (or discrete-valued) function extending across multiple locations within the geographic region, be a discrete score for each discrete spatial zone, or be otherwise determined. For example, the risk assessment module (RAM) can include an equation, wherein only the zone risk score for a location within the spatial zone is calculated using the equation. Zone risk scores for other spatial zones within the geographic region can be calculated in response to the first risk score exceeding a threshold value.

The zone risk score can be updated: in real- or near-real time (e.g., as sensor data is sampled or received, as a predetermined quantity of data above a threshold value is aggregated at the remote computing system, etc.), at a predetermined frequency, in response to occurrence of a predetermined event (e.g., a vehicle entering the geographic region), be static (e.g., predetermined), or be determined at any other suitable time. The zone risk score is preferably determined based on one or more factors extracted from the vehicle event dataset (e.g., as determined in one or more variations of Block S110), but can be otherwise determined. The zone risk score can be determined: heuristically, using a predetermined rule, calculated (e.g., using an equation), using an artificial neural network (e.g., CNN, DNN, etc.), decision tree, clustering, Bayesian network, or be otherwise determined.

The risk assessment module (RAM) functions to provide a model or process to determine the risk score at each location within the geographic risk map of the geographic region, based on the vehicle event data associated with the location within the geographic risk map (e.g., with the spatial zone). The RAM preferably determines a risk score for each risk point (e.g., spatial zone, spatial point, location, etc.) within the risk point distribution (e.g., populates the geographic risk map), but can alternatively or additionally determine a risk score for a subset of the risk points within the distribution, a risk score for a monitored sub-region, a risk score for the instantaneous driving context, or any other suitable risk metric for any other suitable region or context. The RAM preferably includes a continuous function, but can alternatively or additionally include a discretized function or any other suitable function. The RAM preferably includes a parametric model (e.g., can be a parametric module), but can alternatively be a nonparametric model, semi-parametric model, semi-nonparametric model, or include any other suitable model. The RAM can include one or more models. The RAM preferably includes a set of equations (e.g., one or more probability distributions), but can alternatively be a neural network (e.g., CNN), support vector, decision tree, set of rules, classifier (e.g., Bayesian classifier), genetic program, or be otherwise structured. For example, the RAM can include: a discrete probability distribution, a continuous probability distribution, normal distribution (e.g., Gaussian distribution, such as a 2D Gaussian or 3D Gaussian, multi-variate normal distribution, etc.), log-normal distribution, Pareto distribution, discrete uniform distribution, continuous uniform distribution, Bernoulli distribution, binomial distribution, negative binomial distribution, geometric distribution, hypergeometric distribution, beta-binomial distribution, categorical distribution, multinomial distribution, Tweedie distribution, Poisson distribution, exponential distribution, gamma distribution, beta distribution, Rayleigh distribution, Rice distribution, or any other suitable risk determination model. The risk distribution can be centered or have an apex at the external object, at the vehicle, or at any other suitable location. In one example, the risk model includes an equation with a set of weighted factors. However, the model can be otherwise configured. The RAM can include one or more models. Each monitored region can be associated with one or more RAMs at a given time, and can be associated with the same or different RAMs over time (e.g., over a driving session).

The RAM can be operable in the manner, be determined, and/or include such elements as described in U.S. patent application Ser. No. 15/892,899, filed 9 Feb. 2018, which is incorporated herein in its entirety by this reference; however, the RAM can be otherwise suitably operated or determined and can include any other suitable elements. The RAM can be used to determine any risk scores used in conjunction with variations of the method 100, including zone risk scores, local risk scores, route risk scores, and any other suitable risk scores.

In a specific example, Block S130 includes computing a zone risk score associated with each of the set of spatial zones based on the set of near-collision events and the set of collision events (e.g., of the vehicle event dataset), wherein the zone risk score of each spatial zone is computed based on a near-collision frequency and collision frequency associated with each zone (e.g., a normalized frequency of occurrence of a near-collision event or collision event, respectively, based on time spent in the zone, presence in the zone for any length of time, and any other suitable basis), wherein the near-collision frequency and collision frequency are extracted from the vehicle event dataset for each spatial zone. In a related example, the computed zone risk score for each of the set of spatial zones is proportional to a combination of the frequency of near-collision events and the frequency of collision events detected within each spatial zone.

In variations Block S130, wherein each spatial zone of the set of spatial zones defines a roadway feature (e.g., and is labeled with the roadway feature), Block S130 includes computing the zone risk score of each spatial zone based on the roadway feature. Alternatively or additionally, Block S130 can include computing the zone risk score for each roadway feature or combination thereof for each vehicle operator (e.g., wherein a driver can be associated with a first risk score for a 3-way intersection with stop signs and a second risk score for a 4-way intersection with stop lights), wherein the vehicle operator's risk can be used to determine the vehicle route (e.g., minimize roadways with high-risk features), other vehicles' routes (e.g., the vehicle operator's risk is accounted for when calculating the risk for sequential zones along the route while the vehicle is anticipated to be within said zone), or otherwise used. In examples, the roadway feature defined by a spatial zone of the set of spatial zones can include a speed limit associated with the roadway within the spatial zone, a roadway type associated with the roadway segment within the spatial zone, and any other suitable feature. Examples of roadway features include: road width, number of lanes, speed limit, typical traffic patterns, or any other suitable set of features.

3.2 Method—Determining a Route

Figure 5:
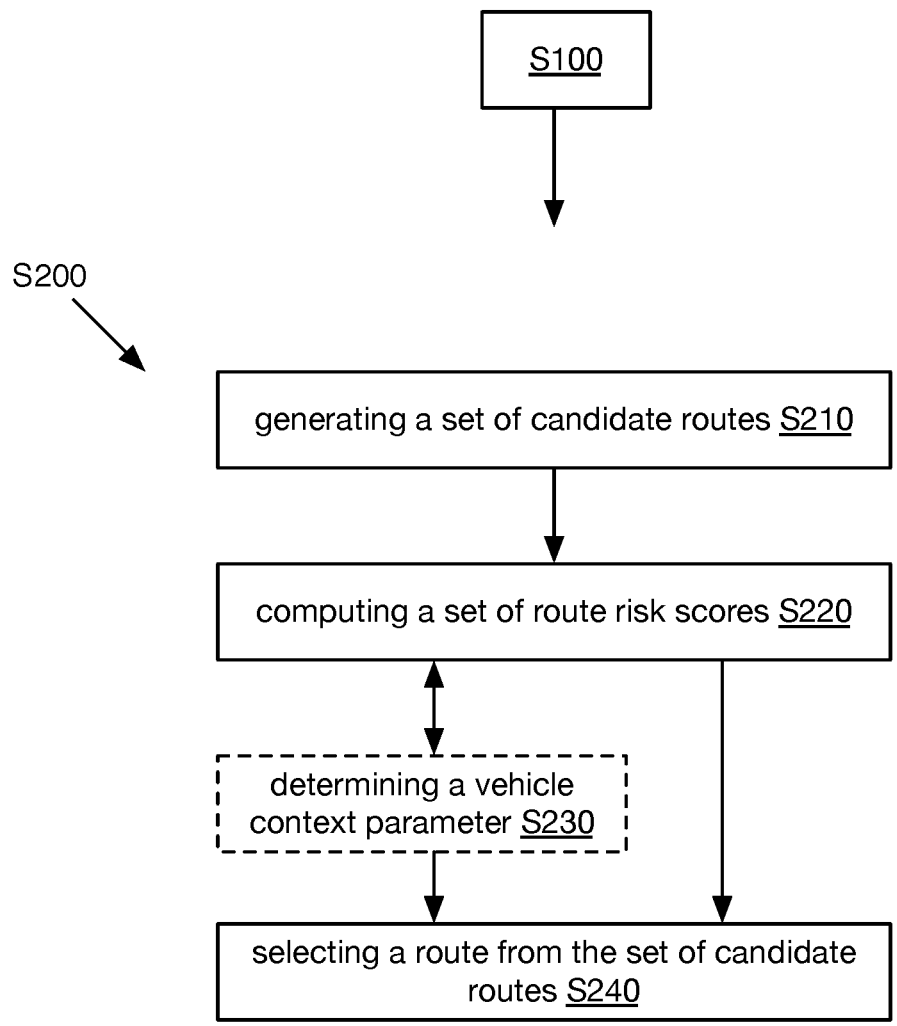
FIG. 5 depicts a flowchart representation of a variation of a portion of the method for safe route determination.

Block S200 includes: automatically determining a route (e.g., a safe route) for a vehicle between two locations located within the geographic region based on the geographic risk map. Block S200 functions to provide navigation instructions (e.g., to a vehicle operator) that define a route for the vehicle to follow, wherein the route is determined based on the integrated risk (e.g., route risk score) of the route (e.g., such that the determined route is maximally safe, substantially safe, least-risky, risk-weighted, of mitigated risk, etc.). As shown in FIG. 5, Block S200 can include: generating a set of candidate routes S210; computing a set of route risk scores S220; determining a vehicle context parameter S230; and selecting a route from the set of candidate routes S240.

Block S210 includes generating a set of candidate routes. Block S210 functions to provide a number of potential routes from which a safe route (e.g., safest route, safety-weighted route, etc.) can be determined (e.g., selected). Block S210 preferably includes generating a set of candidate routes between a present location of a vehicle within the geographic region and a destination within the geographic region, wherein the present location of the vehicle is determined substantially as described above in relation to determining a geographic location. The candidate routes are preferably routes between a first location and a second location (e.g., an origin and a destination, a present location and a future location, etc.), but can additionally or alternatively be multi-destination routes (e.g., including an origin and two or more serial destinations, including an origin and a set of possible nearby destinations, etc.) and/or any other suitable routes. The candidate routes are preferably determined using a navigation method and a mapping database; for example, the candidate routes can be determined from a third-party mapping program (e.g., Google Maps™, Apple Maps™, etc.) that lists multiple navigable routes between any two or more locations. However, the candidate routes can be otherwise suitably determined.

Block S220 includes computing a set of route risk scores. The set of route risk scores preferably have a one-to-one correspondence with the set of candidate routes (i.e., each route of the set of candidate routes has an associated route risk score). Each route risk score can be a representation of the integrated risk associated with traversing the candidate route. In some examples, the route risk score can be context-dependent, and be computed based on both the geographic risk map (e.g., determined in accordance with one or more variations of Block S100) and a vehicle context parameter (e.g., determined in accordance with one or more variations of Block S230); in alternative examples, the route risk score can be computed based on only the geographic risk map. In context-dependent and context-independent cases, the route risk score is preferably a weighted sum of the zone risk scores associated with the spatial zones that intersect the candidate route. However, the route risk score can additionally or alternatively be a vector addition of vectors of varying magnitude, wherein the vector magnitude is proportional (at least in part) to the zone risk score and/or the vehicle context parameter, and/or be computed in any other suitable manner based on any suitable underlying mathematical structure of the geographic risk map (e.g., a continuous multi-valued function that can be evaluated at each location, a directed or undirected graph wherein nodes are intersections and edges are road segments, etc.).

In a variation of a route risk score computed via a weighted sum, Block S220 includes: determining a set of weights having a one-to-one correspondence with a subset of the set of spatial zones, wherein the route intersects each of the subset of the set of spatial zones; multiplying the zone risk score associated with each of the subset of spatial zones with a corresponding weight of the set of weights to generate a set of weighted zone risk scores; and summing the set of weighted zone risk scores to generate the route risk score for the route.

The weights of the weighted sum can be determined based on intrinsic features of the spatial zone and/or the physical aspects of the roadway(s) within the spatial zone. For example, Block S220 can include computing the route risk score via a weighted sum as described above, wherein each weight of the set of weights is proportional to the number of roadways associated with the corresponding spatial zone (e.g., wherein the number is 4 at a 4-way intersection, wherein the number is 1 for a straight or curved roadway segment without an intersection, etc.). In another example, Block S220 includes computing a route risk score via weighted sum, wherein each weight of the set of weights is proportional to a length of a route portion intersecting the corresponding spatial zone. However, Block S220 can additionally or alternatively include computing the route risk score via a weighted sum, wherein the weights depend on extrinsic factors (e.g., vehicle context parameters), as described below.

Block S230 includes determining a vehicle context parameter. Block S230 functions to obtain context for the vehicle operation that can be used to determine context-dependent route risk scores, and/or to enable determination of the desired route from the set of candidate routes (e.g., as an additional metric for determining the route besides the route risk scores). The vehicle context parameter can be used to determine weights of a weighted sum, wherein the weighted sum is the route risk score as described above, but can additionally or alternatively be used to eliminate and/or select candidate routes independent from risk (e.g., wherein the vehicle context parameter is a user preference to avoid toll routes, freeways, etc., resulting in elimination of candidate routes that would negate the user preference) and/or for any other suitable purpose.

Block S230 is preferably performed using an onboard vehicle system (e.g., of the plurality of onboard vehicle systems, associated with a vehicle of the plurality of vehicles, etc.), but can additionally or alternatively be performed by any suitable system.

Determining the vehicle context parameter can optionally include determining operator behavior (e.g., wherein the vehicle context parameter is the operator behavior or a parameter thereof). Examples of operator behaviors include: evasive maneuvers (e.g., steering, braking, acceleration, a combination of control inputs that approach the limits of vehicle capabilities, etc.), pre-incident maneuvers, attentiveness, or any other suitable behavior. The operator behavior is preferably determined from sensor signals monitoring the operator volume (e.g., the interior of the vehicle where the driver or operator is located), such as an interior-facing camera, operator-facing camera, or vehicle control input sensors (e.g., pedal sensors, steering wheel sensors, etc.), but can additionally or alternatively be determined from sensor signals monitoring the exterior volume or any other suitable sensor. Determining the operator behavior can include: identifying the operator behavior in the sensor signals, identifying the sensor signals describing the operator behavior, classifying or labeling the operator behavior (e.g., good, bad, safe, unsafe, etc.), or otherwise processing the operator behavior. The operator behavior can be determined using: a classifier, a pattern matching system, a set of rules (e.g., signals sampled by a predetermined set of sensors within a predetermined time window that are associated with the operator behavior), or otherwise determined. The operator behavior can be stored with the respective near-collision event information, used to determine the respective operator's driver score, or otherwise used.

Operator parameters (user parameters, operator behavior parameters) that can be used to generate and/or determine the vehicle context parameter include: operator profiles (e.g., history, driver score, etc.); quantifiable and/or categorizable operator behavior (e.g., user behavior) data, such as distraction level (e.g., which can be determined using the method disclosed in U.S. application Ser. No. 15/892,899, filed 9 Feb. 2018, which is incorporated herein in its entirety by this reference, or otherwise suitably determined), expressions (e.g., surprise, anger, etc.), responses or actions (e.g., evasive maneuvers, swerving, hard braking, screaming, etc.), cognitive ability (e.g., consciousness), driving proficiency, willful behavior (e.g., determined from vehicle control input positions), attentiveness, gaze frequency or duration in a predetermined direction (e.g., forward direction), performance of secondary tasks (e.g., tasks unrelated to driving, such as talking on a cell phone or talking to a passenger, eating, etc.), or other behavior parameters; or any other suitable operator parameter. The operator can be the operator of the host vehicle, the operator of the object(s) or vehicle(s), or be any other suitable operator.

The operator behavior can be characterized as a behavior class or type, a behavior score (e.g., calculated based on the operator distraction level, expressions, etc.), or otherwise characterized. The operator behavior is preferably determined from the operator-monitoring sensor signals (e.g., internal-facing camera video), but can be backed out of the determined vehicle ego-motion or otherwise determined. The operator behavior can be identified and/or characterized using rules (e.g., within a time window from the near-collision event), heuristics, decision trees, support vectors, probabilitistics (e.g., Naïve Bayes), neural networks, genetic programs, pattern matching (e.g., patterns of one or more sensor data sets), or any suitable method. The operator profile can be the driver profile associated with a vehicle identifier for the respective vehicle (e.g., external vehicle, host vehicle), wherein the vehicle identifier can be determined from sensor measurements recorded by sensor onboard the vehicle (e.g., license plate number extracted from the external-facing camera), the vehicle identifier associated with the computing system, or otherwise determined; be the operator profile associated with a geographic location collocated with the object; be the operator profile associated with the driving session or timeframe (e.g., a scheduled driver for the vehicle); be the operator profile associated with a user identifier (e.g., dongle identifier, user device identifier, face, etc.), or be any other suitable operator profile. The operator profile is preferably automatically generated based on historic vehicle operation data (e.g., recorded during past driving sessions), such as past risk maps, but can alternatively be manually generated (e.g., by the operator, by a fleet or system management entity) or otherwise generated. The operator profile can include the operator's risk score (e.g., calculated based on past risk maps, near-collision history, tailgating history, distraction history, collision history, etc.), routes, operator identifier, operator driving schedule, RAM, or any other suitable information.

Figure 6:
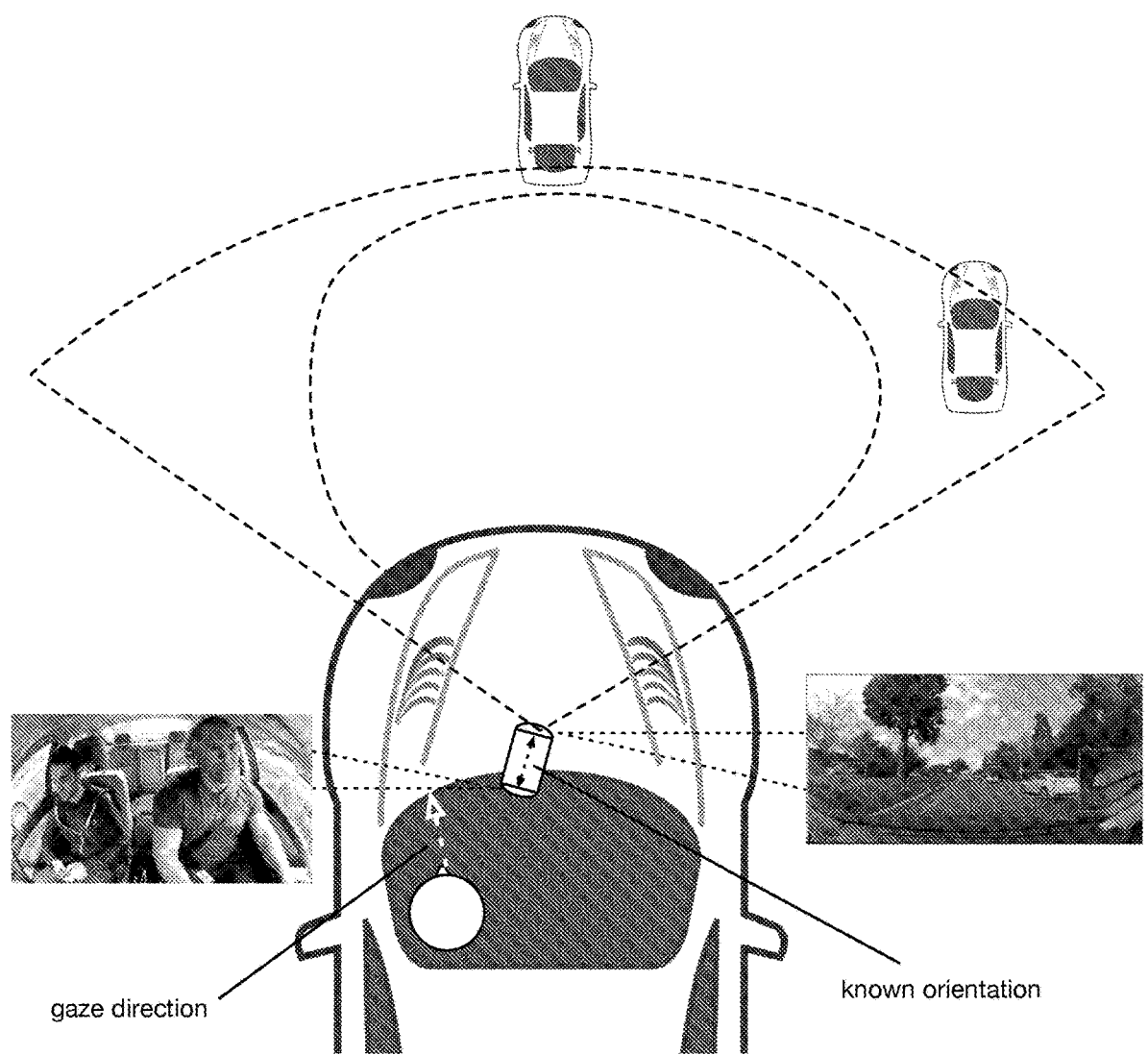
FIG. 6 is an example of determining driver attention and gaze direction in order to determine a vehicle context parameter for route determination.

The operator behavior can be determined from sampled signals monitoring the vehicle interior, or be otherwise determined. In one variation, the operator behavior can be determined from images recorded by an interior-facing camera (e.g., interior video, second video, etc.). The interior-facing camera is preferably directed toward the driver volume, but can alternatively be directed toward the entirety of the interior, or to any suitable volume. In one example, as shown in FIG. 6, operator attention to a detected object can be determined based on an operator's gaze direction relative to the object (e.g., whether the operator is looking at the object) based on the interior-facing sensor signals, the exterior-facing sensor signals, and the known relative orientation of the interior- and exterior-facing sensors. In a specific example, the operator attention can be determined by: determining the operator gaze direction relative to the vehicle (e.g., using eye tracking methods) from the interior image, determining the exterior object position relative to the vehicle from the exterior image, mapping the operator gaze direction to an exterior gaze region using the known relative orientation between the interior-facing camera and exterior-facing camera, assigning a high attention score (or determining that the operator has seen the object) when the exterior gaze region encompasses the exterior object position(s). However, the operator attention can be otherwise determined. In a second variation, the interior images can be analyzed for operator emotion (e.g., surprise) using emotion expression recognition techniques. In a third variation, the sensor signals or vehicle control input positions can be analyzed for patterns indicative of operator behavior (e.g., swerving, sudden braking, etc.). However, the operator behavior can be otherwise determined.

Additional or alternative vehicle context parameters can include: vehicle kinematics (e.g., acceleration, jerk, velocity, etc.), mass, class, make or model, wear, age, control input position (e.g., brake position, accelerator position, transmission position, etc.), current geographic location (e.g., using on-board location systems), past geographic locations or driving route, anticipated driving route (e.g., determined from a navigation system, historic routes, etc.), vehicle position relative to lane markings or other road markings, or other vehicle parameters. Vehicle kinematics can be determined using optical flow methods, on-board kinematic sensors such as accelerometers or IMUs, location sensors, or otherwise determined. Vehicle parameters can be pre-associated with the computing system or set of sensors monitoring the driving session, be vehicle parameters associated with a vehicle identifier for the host vehicle, be parameters determined based on sensor signals sampled during the driving session, or be otherwise determined.

Additional or alternative vehicle context parameters can include: traffic density, time of day, weather, ambient lighting, wheel traction, visual obstructions, or any other suitable contextual parameter. The vehicle context parameter can be retrieved from an external database, measured using onboard sensors, or otherwise determined. ehicle context parameters can optionally include computing system operational parameters, such as available computational power, available power (e.g., the computing device battery's state of charge), available memory, or any other suitable parameter.

In a specific example, wherein the onboard vehicle system includes an interior-facing camera and an exterior-facing camera, wherein the interior-facing camera is statically mounted at a known orientation relative to the exterior-facing camera by a common housing, wherein the exterior-facing camera captures a first video concurrently with a second video captured by the interior-facing camera, Block S230 includes determining the vehicle context parameter based on the first video and the second video. In a related specific example, Block S230 can include determining the vehicle context parameter based on one or more video streams sampled from one or more cameras that are not statically mounted relative to one another at a known orientation (e.g., from one or more cameras affixed to a vehicle at any suitable locations, which can vary from vehicle to vehicle).

In another specific example, Block S230 includes extracting an object position as a function of time from the first video (e.g., using object parameter determination and monitoring substantially as described above), extracting a driver gaze direction as a function of time from the second video, generating a comparison between the driver gaze direction and the object position, and computing a driver behavior score based on the comparison, wherein the vehicle context parameter is the driver behavior score and can be used to modify (e.g., weight, select, etc.) the route risk scores and/or zone risk scores.

In another example, Block S230 includes determining a driver identity using the onboard vehicle system, and retrieving a driver behavior score associated with the driver identity, wherein the vehicle context parameter is the driver behavior score.

In another specific example, Block S230 can include estimating a residence time of a vehicle (e.g., for which the route is being determined) within a spatial zone based on an instantaneous traffic condition within the corresponding spatial zone, wherein the vehicle context parameter is the estimated residence time, and Block S220 (in this example) can include calculating the route risk score based on a weighted sum of the zone risk scores wherein each weight of the set of weights is proportional to the estimated residence time in the corresponding spatial zone during traversal of the route.

Block S240 includes selecting a route from the set of candidate routes. Block S240 functions to determine which of the candidate routes is to be navigated by the vehicle operator based on the desired optimization of the operator (e.g., safest route, safety-weighted, context-dependent, etc.).

In an example, Block S240 includes determining a safest route between the origin and the destination from among the set of candidate routes. The safest route in this example corresponds to the route that has the smallest (e.g., minimum) route risk score of the set of route risk scores (e.g., computed in accordance with one or more variations of Block S220).

In variations, Block S240 includes selecting a context-dependent route. For example, the determined vehicle context parameter can include determining operator behavior indicative that the vehicle operator exhibits high risk behavior on roadways with a speed limit above a threshold value, and Block S240 can include selecting a route having the lowest route risk score that does not include roadways with a speed limit above the threshold value. However, Block S240 can include selecting a route from the candidate routes based on the vehicle context parameter in any suitable manner.

In further variations, Block S240 can include selecting a route from the set of candidate routes based on a multivariable optimization that includes risk minimization in combination with additional constraints. The additional constraints can be defined by the vehicle context parameter, user limits (e.g., delay limits, distance limits, minimum risk adjustment, etc.; received from the user, learned, etc.), and/or be otherwise defined. The limits can be received through a user interface with: an alphanumeric text entry, a slider, a map, or any suitable interface. For example, Block S240 can include receiving a vehicle context parameter that defines a user risk tolerance (e.g., a threshold route risk score), and select the fastest route (e.g., with the shortest estimated travel time) that has a route risk score below the threshold route risk score.

In a second example, Block S240 can include receiving a delay limit from a user (e.g., indicating the maximum amount of additional time that the user is willing to accept, relative to a reference route), and determining routes based on the delay limit. The reference route can be: a standard route between the endpoints, a historic route between the endpoints, a route that accounts for delays, a route that does not account for route risk (e.g., of the vehicle operator and/or vehicle population in the route's geographic region), the fastest route, or be any suitable reference route. In one variation of the second example, the set of available routes is filtered by the delay limit, wherein the route is selected from the filtered set of available routes. In a second variation of the second example, the method optimizes for safety given the delay limit. In a specific example, if the vehicle needs to travel from Palo Alto to an SF destination, which is 35 minutes apart by fastest route, and the user is willing to deviate up to N additional minutes (e.g., to increase the travel time by up to N minutes) to reduce a given amount of risk (e.g., wherein N can be set by user or be selected by default; wherein N can be 5 min, 10 min, etc.). The given amount of risk can be selected by default (e.g., be 10%, 50%, any risk, etc.), selected by the user, or otherwise determined.

In a third example, Block S240 can include receiving a distance limit from a user (e.g., indicating the maximum amount of additional distance that that the user is willing to accept, relative to a reference route, or adjacent regions that the user is willing to travel into), and determining the routes based on the distance limit. The third example is preferably performed similarly to the second example, except using the distance limit in lieu of the delay limit. In a specific example, if the vehicle needs to travel from Palo Alto to an SF destination, which is 45 miles apart by the reference route, and the user is willing to deviate up to M additional miles to reduce a given amount of risk (e.g., wherein M can be set by user or be selected by default; wherein M can be 5 miles, 20 miles, 100 miles, etc.). However, Block S240 can additionally or alternatively include a multivariate optimization that includes route risk scores and any other suitable variables and/or vehicle context parameters.

In a fourth example, Block S240 can include determining a driver-specific category of vehicle events (e.g., near-collision events), and determining the route based on the driver-specific category. The category can be determined based on operator behavior, as described above (e.g., wherein the operator is determined to have a tendency to engage in tailgating-related near-collision events, wherein the operator is determined to frequently fail to check his or her blind spot while executing right turns at intersections, etc.), based on types and/or categories of near-collision or near-crash events as described above in relation to Block S110, and/or otherwise suitably determined. The route determination in this example can include selecting routes that avoid, minimize, or otherwise suitably reduce the likelihood of the driver-specific category of near-collision event occurring along the route, based on the determined driver-specific category (e.g., selecting a route that has a low frequency or likelihood of hard braking events for a driver that exhibits tailgating tendencies, selecting a route that minimizes right turns at intersections for drivers that often fail to check their blind spot while executing right turns, etc.). However, in related examples Block S240 can include selecting a route based on driver behavior to reduce the risk in the context of the driver's specific behavior (e.g., as determined in one or more variations of Block S230, based on a driver-specific geographic risk map as determined in one or more variations of Block S100, etc.) in any other suitable manner.

The method can optionally include Block S300, which includes: routing a vehicle according to the safe route (e.g., determined in conjunction with one or more variations of Block S200). Block S300 can include providing turn-by-turn navigation instructions to a vehicle operator, such that the operator can navigate the determined route. Block S300 can additionally or alternatively include automatically controlling a vehicle (e.g., autonomously) to follow the determined safe route.

Block S300 can include Block S310, which includes: routing a secondary vehicle (e.g., a vehicle that does not include an onboard vehicle system and/or does not collect vehicle event data). For example, Block S310 can include: receiving a safest route request for a secondary vehicle without the onboard vehicle system, wherein the safe route request includes a secondary vehicle location and secondary vehicle destination within the geographic region; retrieving the geographic risk map; determining a secondary vehicle safest route between the secondary vehicle location and the secondary vehicle destination based on the geographic risk map; and transmitting the secondary vehicle safest route to the secondary vehicle.

The method can include training modules based on vehicle event data gathered during vehicle routing (e.g., vehicle operation). The vehicle event data set (e.g., near-collision event data, collision event data, vehicle operation data, etc.) can include the near-collision events (preferably labeled, but alternatively unlabeled) and/or associated data that are aggregated for a given operator, vehicle, user population, location, timeframe (e.g., recurrent timeframe, single timeframe, time period of driving along the selected route, etc.), all method instances (e.g., for a plurality of enabled or un-enabled vehicles), or other parameter. The information set can be used to generate a training set (e.g., supervised, alternatively unsupervised) for module training (e.g., calibration, updating, etc.). Modules that can be trained using the training set can include: the risk assessment module, the safe route selection module, an autonomous vehicle control module (AV control module), or any other suitable module. The trained module is preferably subsequently used in the method, used to control a secondary vehicle (e.g., the AV control module), used to predict actuarial risk for a vehicle operator (e.g., to generate an insurance quote, to calculate an insurance premium, etc.), or otherwise suitably used.

The method can include aggregating vehicle event data for a given geographic location or region (e.g., in real time, for all time, for a recurrent time frame such as 8 AM on a Monday, etc.) to generate the geographic risk map (e.g., a collision risk map for the geographic location. In examples, the method can include receiving a geographic risk map request with a location identifier for a secondary vehicle (e.g., from the secondary vehicle, navigation system, or other endpoint) and/or retrieving and transmitting the geographic risk map associated with the location identifier to the secondary vehicle or associated system for secondary vehicle navigation, operation, or other uses. In examples, the ADAS for secondary vehicles can automatically affect vehicle behavior when the secondary vehicle is in a high-risk area (e.g., defined in the geographic risk map determined in accordance with one or more variations of Block S100); this can include, for example: slowing the vehicle down and/or applying a speed cap to the vehicle in a high-risk area (e.g., a spatial zone having an associated zone risk score above a threshold value), adjusting vehicle handling parameters (e.g., suspension stiffness, drive-by-wire responsivity, braking sensitivity, etc.) to improve a driver's ability to respond to high risk vehicle events (e.g., near-collision events), and any other suitable vehicle behavior modifications. The secondary vehicle can be a vehicle within the enabled vehicle population (e.g., capable of performing the method, a vehicle equipped with an onboard vehicle system, etc.), an un-enabled vehicle outside of the enabled vehicle population (e.g., incapable of performing the method, lacking the onboard vehicle system, etc.), or be any suitable vehicle.

The method of the preferred embodiment and variations thereof can be embodied and/or implemented at least in part as a machine configured to receive a computer-readable medium storing computer-readable instructions. The instructions are preferably executed by computer-executable components preferably integrated with a suitable system and one or more portions of a processor or controller. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various Blocks of the method, any of which can be utilized in any suitable order, omitted, replicated, or otherwise suitably performed in relation to one another.

As a person skilled in the art will recognize from the previous detailed description and from the figures and claims, modifications and changes can be made to the preferred embodiments of the invention without departing from the scope of this invention defined in the following claims.

We claim:

1. A method comprising:
 obtaining near-collision information regarding one or more near-collision events that occur within a geographic region, and/or obtaining collision information regarding one or more collision events that occur within the geographic region, wherein the geographic region defines a spatial zone;
 computing a risk score associated with the spatial zone based on the near-collision information regarding the one or more of the near-collision events and/or based on the collision information regarding the one or more of the collision events;
 computing a route risk score for a candidate route that intersects the spatial zone, wherein the candidate route is between an origin located within the geographic region and a destination located within the geographic region, wherein the route risk score is computed by:
  determining a weight corresponding with the spatial zone,
  generating a weighted zone risk score based at least in part on the weight and the zone risk score associated with the spatial zone, and
  determining the route risk score based on the weighted zone risk score; and
 determining the candidate rout as a safe route between the origin and the destination based on a satisfaction of a criterion;
 wherein the safe route is for routing.

2. The method of claim 1, wherein the spatial zone is one of a plurality of spatial zones defined by the geographic region, and wherein a first subset of the spatial zones is associated with a roadways-junction, and a second subset of the spatial zones is associated with a roadway.

3. The method of claim 1, wherein the weight is proportional to a number of roadways.

4. The method of claim 1, wherein the candidate route has multiple route portions, and wherein the weight is proportional to a length of one of the route portions intersecting the spatial zone.

5. The method of claim 1, wherein the weight corresponds with an estimated residence time for the spatial zone.

6. The method of claim 5, further comprising estimating the residence time based on a traffic condition.

7. The method of claim 1, wherein the zone risk score corresponds with a frequency of a subset of the one or more near-collision events within the spatial zone, and/or a frequency of a subset of the one or more collision events within the spatial zone.

8. The method of claim 1, further comprising detecting one of the one or more near-collision events, wherein the act of detecting comprises:
 obtaining a first video with a first camera;
 detecting an object from the first video;
 determining an object parameter for the object from the first video;
 obtaining a second video with a second camera;
 determining a user behavior score based on the second video; and
 generating a risk map, the risk map comprising risk map scores, at least one of the risk map scores calculated based on the user behavior score and the object parameter.

9. The method of claim 1, wherein the candidate route is one of multiple candidate routes, and wherein the act of determining the safe route between the origin and the destination comprises:
 receiving a user input;
 filtering the candidate routes based on the user input; and
 selecting one of the filtered candidate routes satisfying the criterion as the safe route.

10. A method comprising:
 obtaining near-collision data regarding one or more near-collision events that occur within a geographic region, and/or obtaining collision data regarding one or more collision events that occur within the geographic region, wherein at least one of the one or more near-collision events or at least one of the one or more collision events is detected using an onboard vehicle system, and wherein the geographic region defines spatial zones;
 aggregating the near-collision data and/or the collision data into a vehicle event dataset;
 determining a geographic risk map based on the vehicle event dataset, wherein the geographic risk map comprises zone risk scores associated respectively with the spatial zones;

determining a safe route between a location and a destination based on the geographic risk map;
wherein the safe route is for routing.

11. The method of claim 10, further comprising determining a vehicle context parameter, wherein the safe route is determined based on the geographic risk map in combination with the vehicle context parameter.

12. The method of claim 11, wherein the vehicle context parameter is determined based on a first video generated by a first camera, and a second video generated by a second camera.

13. The method of claim 12, wherein the act of determining the vehicle context parameter comprises extracting an object position as a function of time from the first video, extracting a driver gaze direction as a function of time from the second video, and computing a driver behavior score based on the driver gaze direction and the object position.

14. The method of claim 11, wherein the act of determining the vehicle context parameter comprises determining a driver identity, and retrieving a driver behavior score associated with the driver identity.

15. The method of claim 10, further comprising:
receiving a safe route request for a vehicle, the safe route request comprising the location and the destination; and
retrieving the geographic risk map;
wherein the safe route between the location and the destination is determined based on the geographic risk map for routing the vehicle.

16. The method of claim 10, wherein one of the zone risk scores is computed based on a near-collision frequency and/or a collision frequency.

17. The method of claim 16, wherein one of the spatial zones defines a roadway feature, and wherein the zone risk score of the one of the spatial zones is computed based on the roadway feature.

18. The method of claim 17, wherein the roadway feature comprises a speed limit.

19. The method of claim 10, further comprising detecting the at least one of the one or more near-collision events, wherein the act of detecting comprises:
obtaining a first video with a first camera;
detecting an object from the first video;
determining an object parameter for the object from the first video;
obtaining a second video with a second camera;
determining a user behavior score based on the second video; and
generating a local risk map, the local risk map comprising risk map scores, at least one of the risk map scores calculated based on the user behavior score and object parameter.

20. The method of claim 10, wherein the act of determining the safe route comprises determining a candidate route intersecting at least a subset of the spatial zones, and determining a route risk score for the candidate route, wherein the act of determining the route risk score for the candidate route comprises:
determining a weight for one of the spatial zones,
generating a weighted zone risk score based on a zone risk score associated with the one of the spatial zones and the weight, and
determining the route risk score based on the weighted zone risk score;
wherein the candidate route is determined as the safe route upon a satisfaction of a criterion.

* * * * *